UNITED STATES PATENT OFFICE.

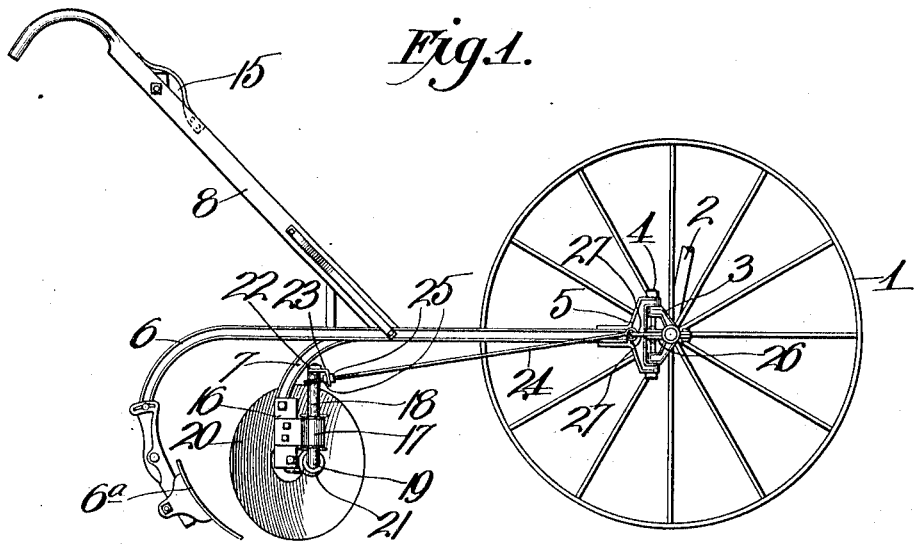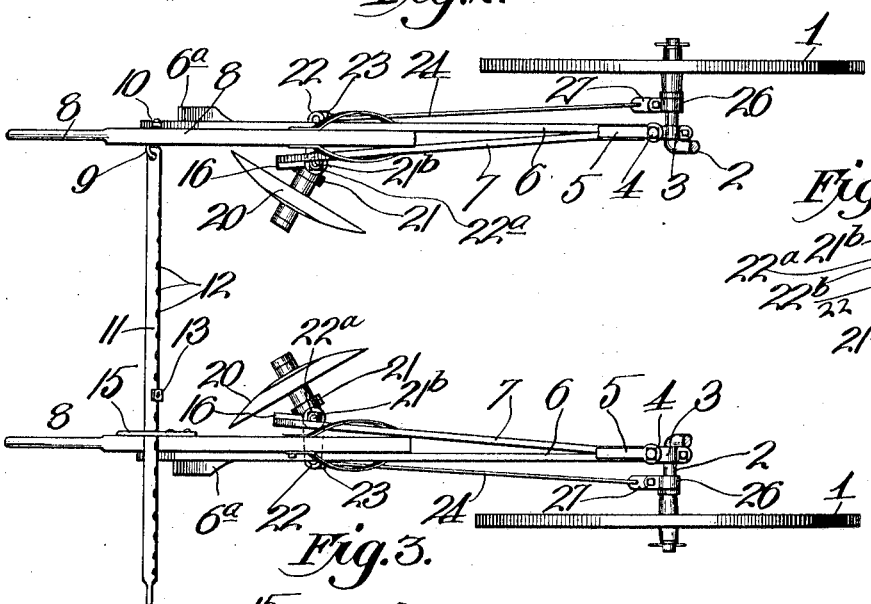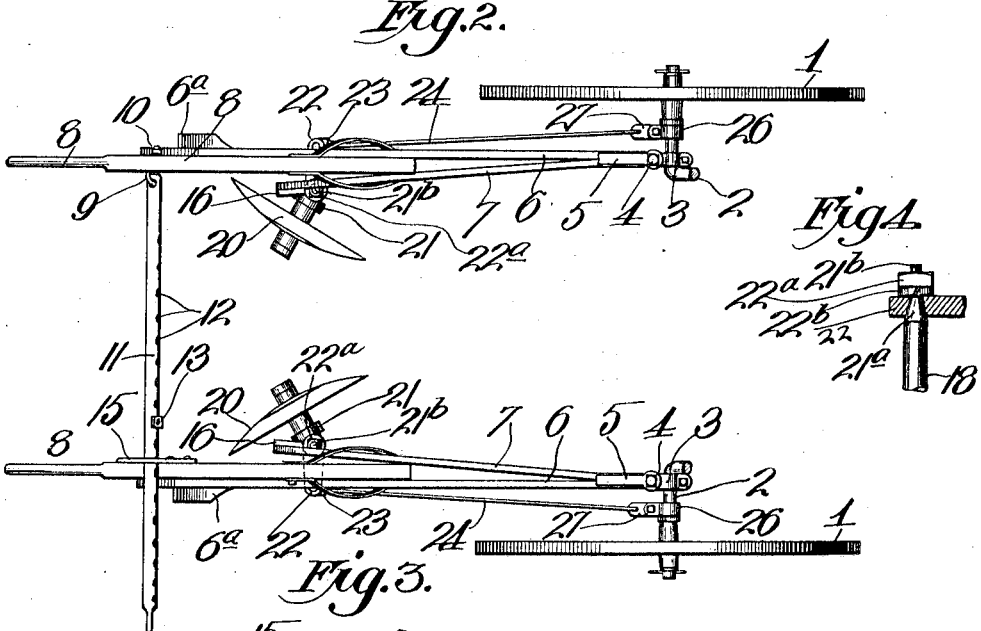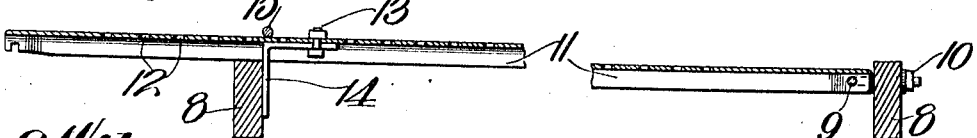

LEWIS H. BELTZER, OF HENNESSEY, OKLAHOMA.

CULTIVATOR.

1,040,999.  Specification of Letters Patent.  Patented Oct. 15, 1912.

Application filed April 22, 1911. Serial No. 622,798.

*To all whom it may concern:*

Be it known that I, LEWIS H. BELTZER, farmer, citizen of the United States, residing at Hennessey, in the county of Kingfisher and State of Oklahoma, have invented certain new and useful Improvements in Cultivators, of which the following is a specification.

This invention relates to cultivators and has for its object to provide means for so attaching disks to the inner beams of a cultivator that, while shiftable laterally with the handles, they shall always maintain the same angle to the line of draft and hence guard against the possibility of injury to a row of plants between them if the ordinary degree of care and skill is displayed in the handling of the machine.

A further object is to produce means for guarding against an accidental decrease in the distance between the disks and thereby relieve the operator of the necessity of closely watching both disks in the cultivating operation, and of the labor involved in maintaining the disks the desired distance apart.

With these and other objects in view, the invention consists in certain novel and peculiar features of construction and organization as hereinafter described and claimed; and in order that it may be fully understood reference is to be had to the accompanying drawing, in which—

Figure 1, is a side view of a walking cultivator provided with a disk attachment embodying my invention, the near wheel of the cultivator being omitted. Fig. 2, is a top plan view of the same, with both wheels in place. Fig. 3, is a transverse section taken through the handles and the gage bar extending transversely thereof. Fig. 4, is a detail vertical section showing one of the disk-carrying shafts and a crank arm adjustably secured thereto.

In the said drawing, 1 indicates the carrying wheels and 2 the customary crank axle or its equivalent of the cultivator.

3 are the customary brackets mounted on the axle and pivoted at 4 to brackets 5, to which are secured outer and inner beams 6 and 7, the former being provided with the customary bull tongues or shovels 6ª, and secured in the customary manner or otherwise to each set of beams, is a handle 8.

9 is an eye-bolt extending through the left hand handle and secured in position by a nut 10. Pivotally engaging the eye-bolt is a gage bar 11 provided with a longitudinal series of holes 12, to accommodate adjustment of bolt 13, by which a depending arm 14 is clamped in the inner or channel side of the bar; said arm being adapted to engage the inner side of the opposite or right hand handle and thus prevent the handles moving toward each other, and to prevent the bar from being jolted upward, a keeper or retainer 15 is secured to the last-named handle and overlies the gage bar, one end of the retainer being free to permit the gage bar to be slipped between the same and the handle in placing it in or removing it from operative position.

16 are plates or standards arranged vertically and secured to the rear ends of the inner or short beams 7, and said plates are provided with vertical bearing sleeves 17, wherein are journaled short vertical shafts 18 provided at their lower ends with outwardly projecting crank arms 19, on which are journaled disks 20, the inner ends of the hubs of the disk being covered by caps 21 to exclude sand and dirt from the journals.

The upper ends of the shafts are tapered at 21ª and terminate in threaded stems 21ᵇ, and engaging the tapered portions 21ª are crank arms 22, the same being clamped rigidly to the shafts by means of nuts 22ª and interposed spring washers 22ᵇ.

Pivoted to the outer ends of the crank arms 22 are angle plates 23, and extending through said angle plates are rods 24 which substantially parallel the inner beams 7 and are secured firmly to the pivoted angle plates by nuts 25, which engage the rear ends of the rods at opposite sides of the angle plates. The front ends of the angle plates are pivotally connected or linked to collars 26 secured on the axle 2 between the wheels and collars 3, the connections between the rods and collars 26 being preferably by means of short links 27.

Assuming that the parts are arranged as shown, it will be apparent that the disks cannot move nearer together because of the gage bar and cannot move farther apart accidentally owing to the inward and downward pressure which the operator imposes on the handles, and owing to the fact that the disks are unable to move nearer together it will be apparent that the operator need watch closely only a single disk as the companion one will travel in a line parallel therewith. Because of this fact less skill is required for the proper control of the machine.

Should the operator swing the handles laterally, the disks will move in the same direction but will maintain the same angle to the line of draft owing to the fact that the inner beams and the rods 24 are substantially parallel and are pivoted at substantially equal distances from shaft 18 and the outer end of crank handle 22. By thus maintaining the disks at the same angles they always turn furrows of the same width, and knowing this, the operator can gage their positions with reference to the plants more accurately and avoid chance of accidentally destroying the same. Another advantage in maintaining the disks at the same angle to the line of draft is that the operator can turn furrows of more uniform depth.

For cultivating cotton, garden stuff, sugar beets and other small or young vegetation, I have found disks of this character preferable to the ordinary shovels as there is less danger of cutting the roots of the plants. In the drawings, the disks are shown as arranged to throw outwardly but by loosening nuts 22ª, the positions of the disks can be reversed so that they shall throw inwardly, the nuts being then tightened to clamp the arms 22 to the shafts 18 in their new relation, so that the rods 24 shall retain the parallel relation with the inner beams necessary in maintaining the disks at the same angles, irrespective of the lateral movement imparted to the handles by the operator for accommodating plants which are out of line or for any other purpose.

From the above description it will be apparent that I have produced a cultivator possessing the features of advantage enumerated as desirable, and I wish it to be understood that while I have illustrated and described the preferred embodiment of the invention I do not desire to be restricted to the exact details of construction shown and described as obvious modifications will suggest themselves to one skilled in the art.

I claim:—

1. A cultivator, comprising carrying wheels, an axle, brackets secured to the axle, brackets pivoted for horizontal movement to the first-named brackets, a pair of rearwardly projecting beams carried by each of the last-named brackets, one constituting the outer and the other the inner beam, cultivating appliances attached to the rear ends of the outer beams, a handle rigid with each pair of beams, a gage bar connecting the handles and limiting their movement toward each other without interfering with their movement in the opposite direction, vertical standards attached to the said inner beams, and provided with vertical bearing sleeves, short vertical shafts journaled in said sleeves and provided at their lower ends with crank arms and terminating in tapered upper ends and threaded stems projecting upwardly from said ends, cultivating disks journaled on said crank arms, crank arms engaging said tapered portions of said shafts, means engaging said threaded stems and clamping the last-named crank arms rigidly on said tapered portions, angle plates pivoted to said last-named crank arms and rods connecting said angle plates with the axle and extending substantially parallel with said inner beams.

2. The combination of a cultivator provided with beams pivoted to swing laterally, cultivating devices carried by said beams, handles carried by the beams, a gage bar secured to one of the handles and resting on the other and provided with a depending arm engaging the inner side of the last-named handle, and a retainer to hold the bar upon said handle.

3. The combination of a cultivator provided with beams pivoted to swing laterally, cultivating devices carried by said beams, handles carried by the beams, a gage bar secured to one of the handles and resting on the other and provided with a longitudinal series of holes, a bolt engaging one of said holes, an arm secured to the gage bar by said bolt and engaging the inner side of the handle on which the gage bar rests, and a retainer secured to said handle and overlying the gage bar.

In testimony whereof I affix my signature, in the presence of two witnesses.

LEWIS H. BELTZER.

Witnesses:
J. L. HINES,
J. L. MURPHY.